United States Patent
Koga

(10) Patent No.: US 8,878,843 B2
(45) Date of Patent: Nov. 4, 2014

(54) IMAGE POSITION ADJUSTMENT DEVICE

(75) Inventor: Ko Koga, Setagaya-ku (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 170 days.

(21) Appl. No.: 13/583,565

(22) PCT Filed: Mar. 11, 2010

(86) PCT No.: PCT/JP2010/054092
§ 371 (c)(1),
(2), (4) Date: Sep. 7, 2012

(87) PCT Pub. No.: WO2011/111201
PCT Pub. Date: Sep. 15, 2011

(65) Prior Publication Data
US 2013/0044138 A1    Feb. 21, 2013

(51) Int. Cl.
*G06T 15/00* (2011.01)
*B60K 35/00* (2006.01)
*G02B 27/01* (2006.01)

(52) U.S. Cl.
CPC ........ *G02B 27/01* (2013.01); *G02B 2027/0138* (2013.01); *B60K 2350/2052* (2013.01); *G02B 2027/0181* (2013.01); *G02B 2027/0187* (2013.01); *B60K 35/00* (2013.01); *B60K 2350/941* (2013.01); *G02B 2027/0154* (2013.01)
USPC .......................................... 345/419; 345/418

(58) Field of Classification Search
CPC combination set(s) only.
See application file for complete search history.

(56) References Cited

U.S. PATENT DOCUMENTS

| 5,703,637 | A | 12/1997 | Miyazaki et al. |
| 2009/0201225 | A1 | 8/2009 | Okada et al. |
| 2009/0231687 | A1* | 9/2009 | Yamamoto .................... 359/359 |
| 2010/0290674 | A1* | 11/2010 | Kim ............................. 382/106 |

FOREIGN PATENT DOCUMENTS

| JP | H7-135623 A | | 5/1995 |
| JP | H11-263145 A | | 9/1999 |
| JP | 2003-029198 A | | 1/2003 |
| JP | 2008-155720 | * | 7/2008 |
| JP | 2008-155720 A | | 7/2008 |
| JP | 2009-145846 A | | 7/2009 |
| JP | 2009-163084 A | | 7/2009 |
| JP | 2009-196473 A | | 9/2009 |
| JP | 2009-244869 A | | 10/2009 |
| JP | 2009-292409 A | | 12/2009 |

* cited by examiner

*Primary Examiner* — James A Thompson
(74) *Attorney, Agent, or Firm* — Sughrue Mion, PLLC

(57) ABSTRACT

In order to achieve reduction in size, an image position adjustment device (1) includes a light source unit (3) which emits visible light and infrared light, a movable cold mirror (12) which reflects visible light and transmits infrared light, a second scanner mirror (13) which reflects infrared light transmitted through the movable cold mirror (12), a windshield glass (F) which displays an image with visible light reflected by the movable cold mirror (12), and a first image processing unit (5) which images the driver (D) using reflected light of infrared light reflected by the second scanner mirror (13) on the driver (D) to detect a line-of-sight position of the driver (D). The position of an image is adjusted in accordance with the line-of-sight position detected by the first image processing unit (5).

8 Claims, 4 Drawing Sheets

IMAGE POSITION ADJUSTMENT DEVICE

CROSS REFERENCE TO RELATED APPLICATIONS

This application is a National Stage of International Application No. PCT/JP2010/054092 filed Mar. 11, 2010, the contents of all of which are incorporated herein by reference in their entirety.

TECHNICAL FIELD

The present invention relates to an image position adjustment device which adjusts the position of an image in accordance with a line-of-sight position of a user.

BACKGROUND ART

In the related art, as an image position adjustment device which adjusts the position of an image in accordance with a line-of-sight position of a user, for example, a device described in Patent Literature 1 is known. Patent Literature 1 describes a HUD [Head Up Display] device which displays an image within a visual field of a driver. The HUD device includes a visible light source which emits visible light for image display, an infrared light source which emits infrared light, and line-of-sight position detection unit for detecting a line-of-sight position of a driver using infrared light. The position of the image is adjusted in accordance with the detected line-of-sight position of the driver.

CITATION LIST

Patent Literature

[Patent Literature 1] Japanese Unexamined Patent Application Publication No. 2008-155720

SUMMARY OF INVENTION

Technical Problem

Meanwhile, since the HUD device including the above-described image position adjustment function is provided in the interior of a vehicle, the space in the interior is narrowed depending on the size of the device. For this reason, there is demand for further reducing the size of the device.

Accordingly, an object of the invention is to provide an image position adjustment device capable of achieving reduction in size.

Solution to Problem

In order to solve the above-described problem, an image position adjustment device according to the invention includes a light source unit which emits visible light and infrared light, first movable reflecting unit for reflecting visible light and transmitting infrared light, second movable reflecting unit for reflecting infrared light transmitted through the first movable reflecting unit, display unit for displaying an image using visible light reflected by the first movable reflecting unit, and line-of-sight detection unit for imaging a user using reflected light of infrared light reflected by the second movable reflecting unit on the user to detect a line-of-sight position of the user. The position of the image is adjusted in accordance with the line-of-sight position detected by the line-of-sight detection unit.

With the image position adjustment device according to the invention, the user is imaged to detect the line-of-sight position, and the position of the image can be adjusted to a visible position in accordance with the line-of-sight position, thereby improving convenience for the user. The image position adjustment device has a configuration in which visible light for image display and infrared light for detecting the line-of-sight position of the user are emitted from the same light source unit, thereby achieving reduction in the size of the device compared to a case where a visible light source unit for image display and an infrared light source unit for line-of-sight position detection are provided at different places.

In the image position adjustment device according to the invention, it is preferable that infrared light is laser light.

With this image position adjustment device, the line-of-sight position is detected using laser light which is unlikely to be affected by ambient light compared to candescent light or the like, thereby suppressing the occurrence of erroneous detection. Therefore, it is possible to achieve improvement in reliability relating to line-of-sight position detection.

It is preferable that the image position adjustment device according to the invention further includes third movable reflecting unit for reflecting visible light and infrared light toward the first movable reflecting unit.

With this image position adjustment device, since infrared light is reflected twice by the third movable reflecting unit and the second movable reflecting unit, the projection range of infrared light can be extended over a wide range according to the movable range of the third movable reflecting unit and the movable range of the second movable reflecting unit. Accordingly, with this image position adjustment device, since the projection range of infrared light onto the user is extended, it is possible to image the user over a wide range, thereby achieving improvement in reliability relating to the detection of the line-of-sight position of the user.

Advantageous Effects of Invention

According to the invention, it is possible to achieve reduction in the size of the image position adjustment device.

DESCRIPTION OF EMBODIMENTS

Figure 1:
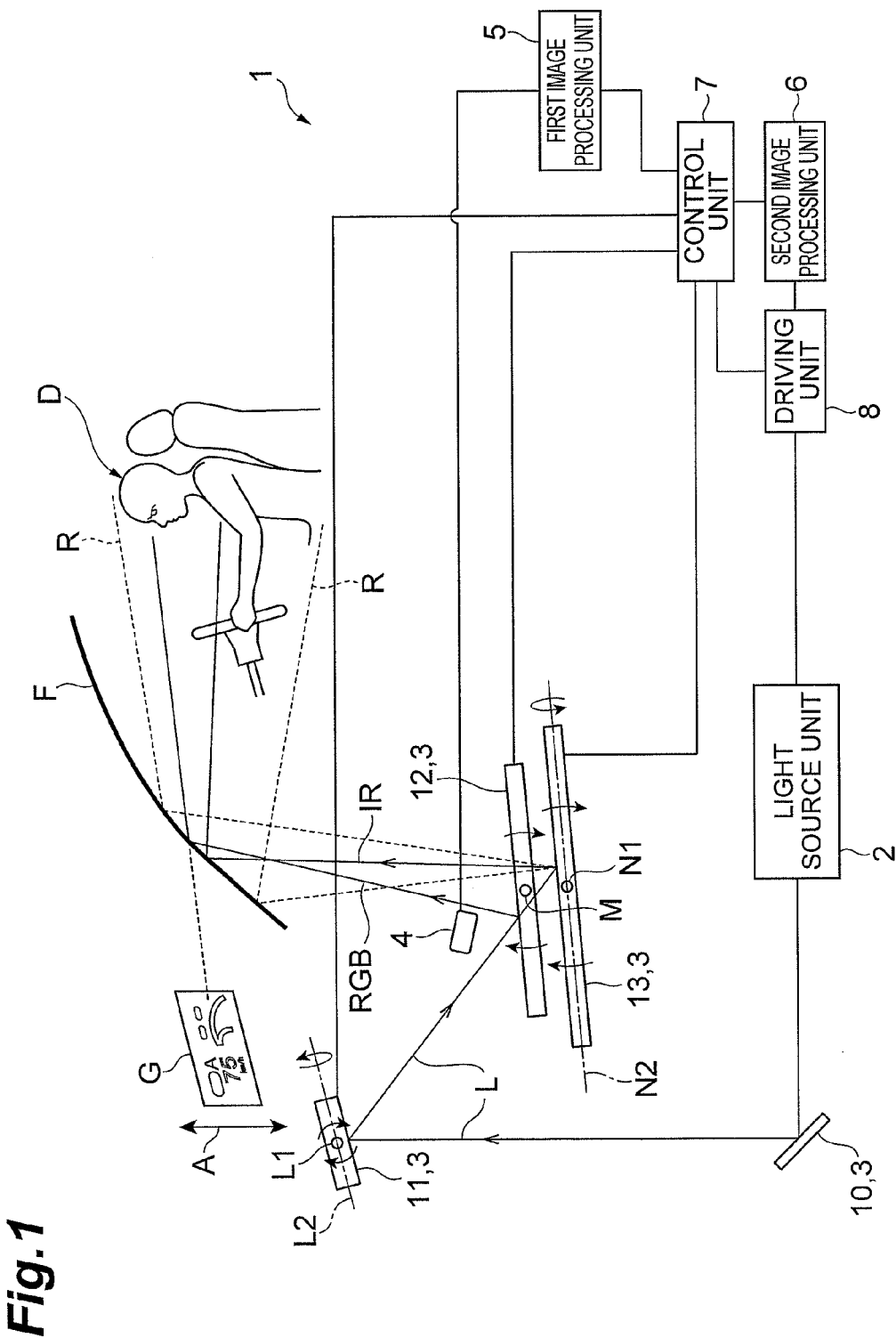
FIG. 1 is a diagram showing a first embodiment of a HUD device according to the invention.

Hereinafter, a preferred embodiment of the invention will be described in detail with reference to the drawings. In the drawings, the same or corresponding portions are represented by the same reference numerals, and overlapping description will not be repeated.

[First Embodiment]

As shown in FIG. 1, a HUD [Head Up Display] device 1 according to a first embodiment is a device which displays an image G, such as vehicle speed information or road shape information, on a windshield glass F within a visual field of a driver D. The HUD device 1 has a function as an image position adjustment device of adjusting the position of the image G. The HUD device 1 is provided inside an instrument panel of a vehicle.

The HUD device 1 includes a light source unit 2, an optical system 3, and a CMOS [Complementary Metal Oxide Semiconductor] sensor 4. The HUD device 1 includes a first image processing unit 5, a second image processing unit 6, a control unit 7, and a driving unit 8.

The light source unit 2 has a laser light source which emits laser light L. Laser light L includes the waveform components of visible light RGB and infrared light IR. Laser light L emitted from the light source unit 2 is projected onto the windshield glass F through the optical system 3. The windshield glass F functions as display unit described in the claims.

The optical system 3 has a fixed mirror 10, a first scanner mirror 11, a movable cold mirror 12, and a second scanner mirror 13.

The fixed mirror 10 reflects laser light L emitted from the light source unit 2 toward the first scanner mirror 11.

The first scanner mirror 11 is a planar mirror which reflects laser light L reflected by the fixed mirror 10 toward the movable cold mirror 12. The first scanner mirror 11 has two orthogonal rotational axes L1 and L2 parallel to the reflecting surface. The first scanner mirror 11 rotates around the rotational axes L1 and L2 to change the reflection angle, and thus laser light L is scanned. The first scanner mirror 11 performs scanning such that visible light RGB of laser light L reflected on the movable cold mirror 12 draws a two-dimensional image G. The first scanner mirror 11 functions as third movable reflecting unit described in the claims.

The movable cold mirror 12 is a flat plate-shaped cold mirror which reflects visible light RGB toward the windshield glass F and transmits infrared light IR. The movable cold mirror 12 has a rotational axis M parallel to the reflecting surface. The movable cold mirror 12 oscillates around the rotational axis M to change the reflection angle, and thus the position in the up-down direction (the arrow A direction of FIG. 1) of the image G projected onto the windshield glass F using visible light RGB is adjusted. The movable cold mirror 12 functions as first movable reflecting unit described in the claims.

The second scanner mirror 13 is a planar mirror which reflects infrared light IR transmitted through the movable cold mirror 12 toward the windshield glass F. The second scanner mirror 13 is disposed on the rear side of the movable cold mirror 12. The second scanner mirror 13 has two orthogonal rotational axes N1 and N2 parallel to the reflecting surface. The second scanner mirror 13 rotates around the rotational axes N1 and N2 to change the reflection angle, and thus the projection range of infrared light IR is extended. A broken line R of FIG. 1 indicates the projection range of infrared light IR. The second scanner mirror 13 functions as second movable reflecting unit described in the claims.

Infrared light IR reflected by the second scanner mirror 13 is reflected by the windshield glass F again and projected toward the driver D. A part of infrared light IR projected onto the driver D is reflected at the surface of the driver D, becomes reflected light, is reflected by the windshield glass F again, and returns to the second scanner mirror 13 side.

The CMOS sensor 4 is an imaging element which detects infrared light IR. The CMOS sensor 4 is disposed near the second scanner mirror 13 inside the instrument panel. The CMOS sensor 4 is electrically connected to the first image processing unit 5. The CMOS sensor 4 detects infrared light IR (reflected light) reflected at the surface of the driver D, and thus the driver D is imaged. The CMOS sensor 4 outputs information relating to the imaged driver D to the first image processing unit 5 as an imaging signal.

Figure 2:
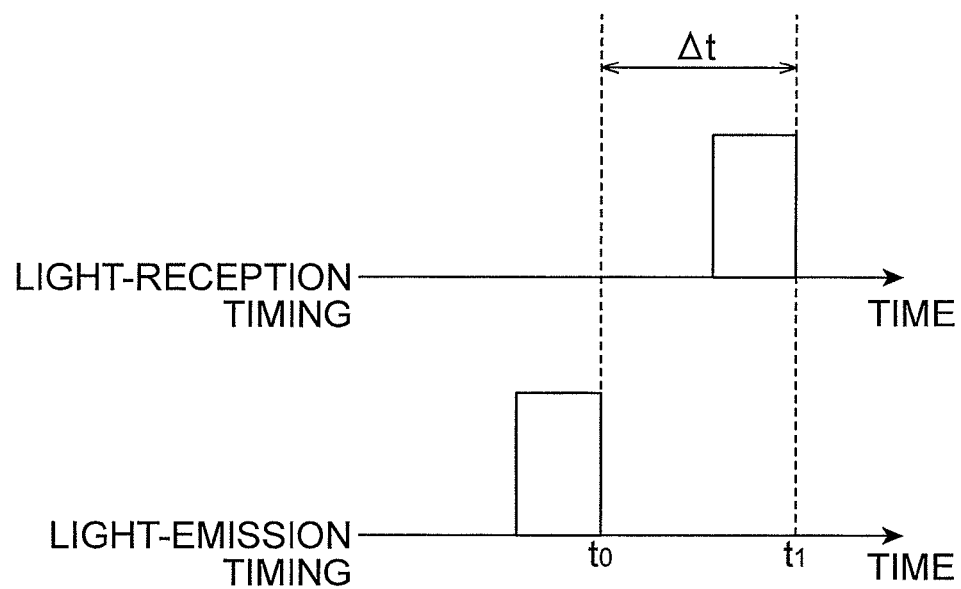
FIG. 2 is a diagram illustrating acquisition of three-dimensional image information of a driver.

The first image processing unit 5 detects the line-of-sight position of the driver D through image processing. The detection of the line-of-sight position of the driver D in the first image processing unit 5 will be described with reference to the drawings. As shown in FIGS. 1 and 2, the first image processing unit 5 is electrically connected to the CMOS sensor 4 and the control unit 7. The first image processing unit 5 acquires the light-emission timing $t_0$ of laser light L, that is, infrared light IR in the light source unit 2 on the basis of a light-emission signal input from the control unit 7. The first image processing unit 5 acquires the light-reception timing $t_1$ of infrared light IR from the imaging signal from the CMOS sensor 4. The first image processing unit 5 calculates image information in the depth direction (the traveling direction of infrared light IR on the driver D) from the difference $\Delta t$ between the light-emission timing $t_0$ and light-reception timing $t_1$ of infrared light IR. The first image processing unit 5 acquires three-dimensional image information of the driver D from two-dimensional image information of the driver D included in the imaging signal of the CMOS sensor 4 and the calculated image information in the depth direction. The first image processing unit 5 detects the line-of-sight position of the driver D on the basis of the three-dimensional image information of the driver D. The line-of-sight position of the driver D is detected, for example, from the direction of the face of the driver D. The first image processing unit 5 outputs information relating to the detected line-of-sight position of the driver D to the control unit 7 as a line-of-sight position signal.

The second image processing unit 6 generates the image content projected onto the windshield glass F. The second image processing unit 6 is electrically connected to a vehicle control ECU [Electronic Control Unit] (not shown), and generates the image content in accordance with vehicle speed information, road shape information, or the like input from the vehicle control ECU. The second image processing unit 6 outputs an image signal relating to the generated image content to the control unit 7 and the driving unit 8.

The control unit 7 performs overall control of the HUD device 1. The control unit 7 is electrically connected to the first image processing unit 5, the second image processing unit 6, and the driving unit 8. The control unit 7 performs light-emission control of the light source unit 2 through the driving unit 8. The control unit 7 is electrically connected to the first scanner mirror 11, the movable cold mirror 12, and the second scanner mirror 13. The control unit 7 performs driving control of the first scanner mirror 11, the movable cold mirror 12, and the second scanner mirror 13. The control unit 7 performs driving control of the mirrors 11 to 13 in accordance with the image signal of the second image processing unit 6. The control unit 7 performs driving control of the mirrors 11 to 13 in synchronization with light-emission control of the light source unit 2 in the driving unit 8.

The control unit 7 determines whether or not the adjustment of the position of the image G is required on the basis of the line-of-sight position signal of the first image processing unit 5. When it is determined that the adjustment of the position of the image G to the visible position of the driver D is required, the control unit 7 performs following calculation for moving the position of the image G to follow the line-of-sight position of the driver D. The control unit 7 drives the movable cold mirror 12 in accordance with the result of the following calculation to adjust the position of the image G projected onto the windshield glass F. The control unit 7 sets a projection prohibition area for preventing light from directly entering the eyes of the driver D on the basis of the line-of-sight position signal of the first image processing unit 5.

The driving unit 8 performs driving control of the light source unit 2 on the basis of a control signal of the control unit 7 and the image signal of the second image processing unit 6. The driving unit 8 performs emission control relating to the start and stop of emission of the light source unit 2 or modulation control of laser light. The driving unit 8 performs control such that laser light is not projected onto the projection prohibition area set by the control unit 7.

Next, the flow of control of the HUD device 1 according to the first embodiment will be described with reference to the drawings.

Figure 3:
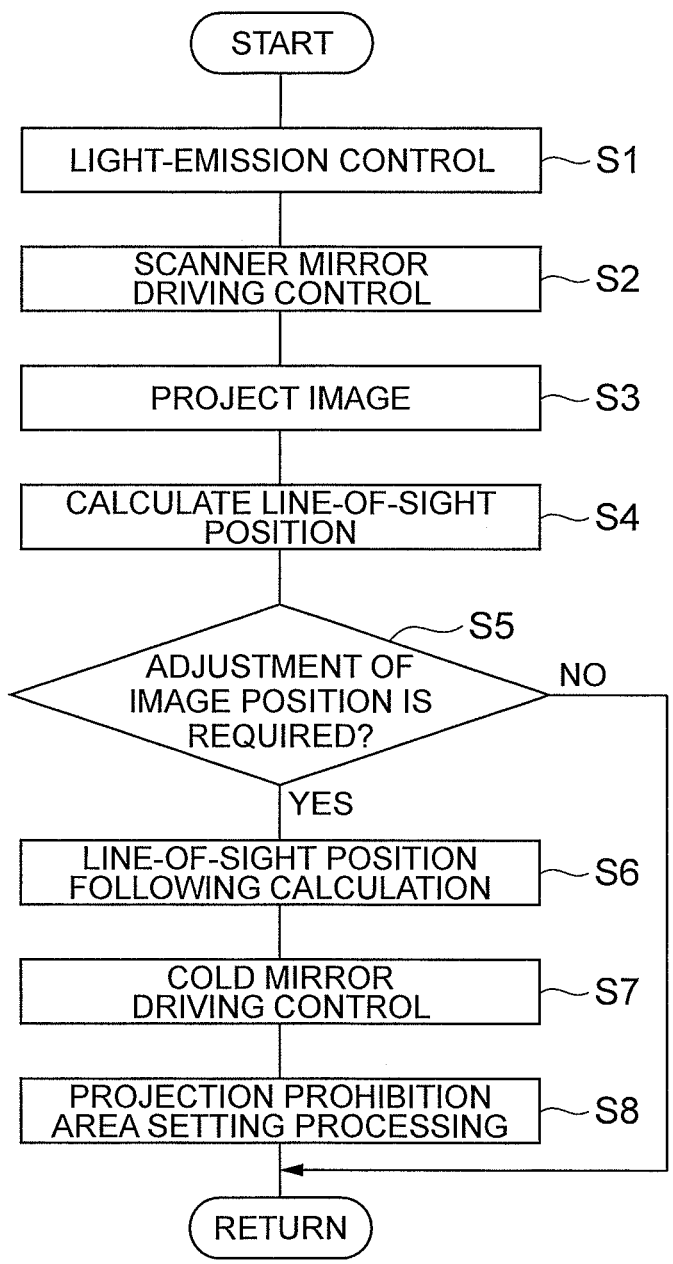
FIG. 3 is a flowchart showing the flow of control of the HUD device according to the first embodiment.

As shown in FIG. 3, first, in the HUD device 1, laser light L is emitted from the light source unit 2 by the driving unit 8 (S1). At this time, when the projection prohibition area is set in advance, the driving unit 8 performs control such that laser light is not projected onto the projection prohibition area. The control unit 7 performs driving control of the first scanner mirror 11 and the second scanner mirror 13 with the emission of laser light L (S2). Accordingly, laser light L is scanned by the first scanner mirror 11, visible light RGB reflected by the movable cold mirror 12 of the scanned laser light L reaches the windshield glass F, and thus an image is projected (S3).

Infrared light IR is extended in the projection range with the driving of the second scanner mirror 13, reflected by the windshield glass F, and is projected onto the driver D over a wide range. A part of infrared light IR projected onto the driver D is reflected at the surface of the driver D, reaches the windshield glass F, is reflected by the windshield glass F again, and is detected in the CMOS sensor 4. The first image processing unit 5 acquires the three-dimensional image information of the driver D on the basis of a light-emission signal of the control unit 7 and the imaging signal of the CMOS sensor 4. The first image processing unit 5 detects the line-of-sight position of the driver D (S4).

Thereafter, the control unit 7 determines whether or not the adjustment of the image position is required on the basis of the line-of-sight position signal of the first image processing unit 5 (S5). When it is determined that the adjustment of the image position is not required, the control unit 7 ends the processing, returns to S1, and continues the projection of the image G.

When it is determined that the adjustment of the image position is required, the control unit 7 performs the following calculation for moving the position of the image G to follow the line-of-sight position of the driver D (S6). The control unit 7 drives the movable cold mirror 12 in accordance with the result of the following calculation to adjust the position of the image G projected onto the windshield glass F (S7). Subsequently, the control unit 7 sets the projection prohibition area for preventing light from directly entering the eyes of the driver D on the basis of the line-of-sight position signal of the first image processing unit 5 (S8). Thereafter, the processing ends and returns to S1.

Next, the functional effect of the HUD device 1 according to the first embodiment will be described.

With the HUD device 1 according to the first embodiment, the driver D is imaged using infrared light IR to detect the line-of-sight position, and the position of the image G can be adjusted to the visible position in accordance with the line-of-sight position, thereby achieving improvement in convenience for the driver D. A configuration in which visible light RGB for image display and infrared light IR for line-of-sight position detection are emitted from the same light source unit 2 is made, thereby achieving reduction in the size of the device compared to a case where a visible light source unit for image display and an infrared light source unit for line-of-sight position detection are provided at different places.

In the HUD device 1, a laser light source is used as the light source unit 2 which emits infrared light IR, and the line-of-sight position is detected using laser light which is unlikely to be affected by ambient light compared to candescent light or the like. Therefore, it is possible to suppress the occurrence of erroneous detection of the line-of-sight position, thereby achieving improvement in reliability relating to line-of-sight position detection.

According to the HUD device 1, infrared light IR is reflected twice by the first scanner minor 11 and the second scanner minor 13, thereby extending the projection range of infrared light IR over a wide range according to the movable range of the first scanner minor 11 and the movable range of the second scanner minor 13. Accordingly, in the HUD device 1, since the range in which the driver D can be imaged is largely extended, it becomes possible to recognize the posture of the driver or the like, thereby avoiding the occurrence of erroneous detection of the line-of-sight position of the driver. In the HUD device 1, since the line-of-sight position of the driver D is detected on the basis of the three-dimensional image information of the driver D, it is possible to obtain the detection result with higher reliability compared to a case where the line-of-sight position is detected on the basis of two-dimensional image information. Therefore, according to the HUD device 1, it is possible to achieve improvement in reliability relating to the detection of the line-of-sight position of the driver D.

In the HUD device 1, since the range in which the driver D can be imaged using infrared light IR is extended, even when the projection of infrared light IR is prohibited with the neighbor of the eyes of the driver as a projection prohibition area, it becomes possible to detect the line-of-sight position with high accuracy from the posture or the direction of the face of the driver. Therefore, according to the HUD device 1, it is possible to avoid giving a sense of discomfort the driver because infrared light IR is projected onto the eyes of the driver.

According to the HUD device 1, since all of the constituent components including the CMOS sensor 4 can be accommodated inside the instrument panel or the like, it is advantageous for improvement in design of the interior and reduction in size.

[Second Embodiment]

Figure 4:
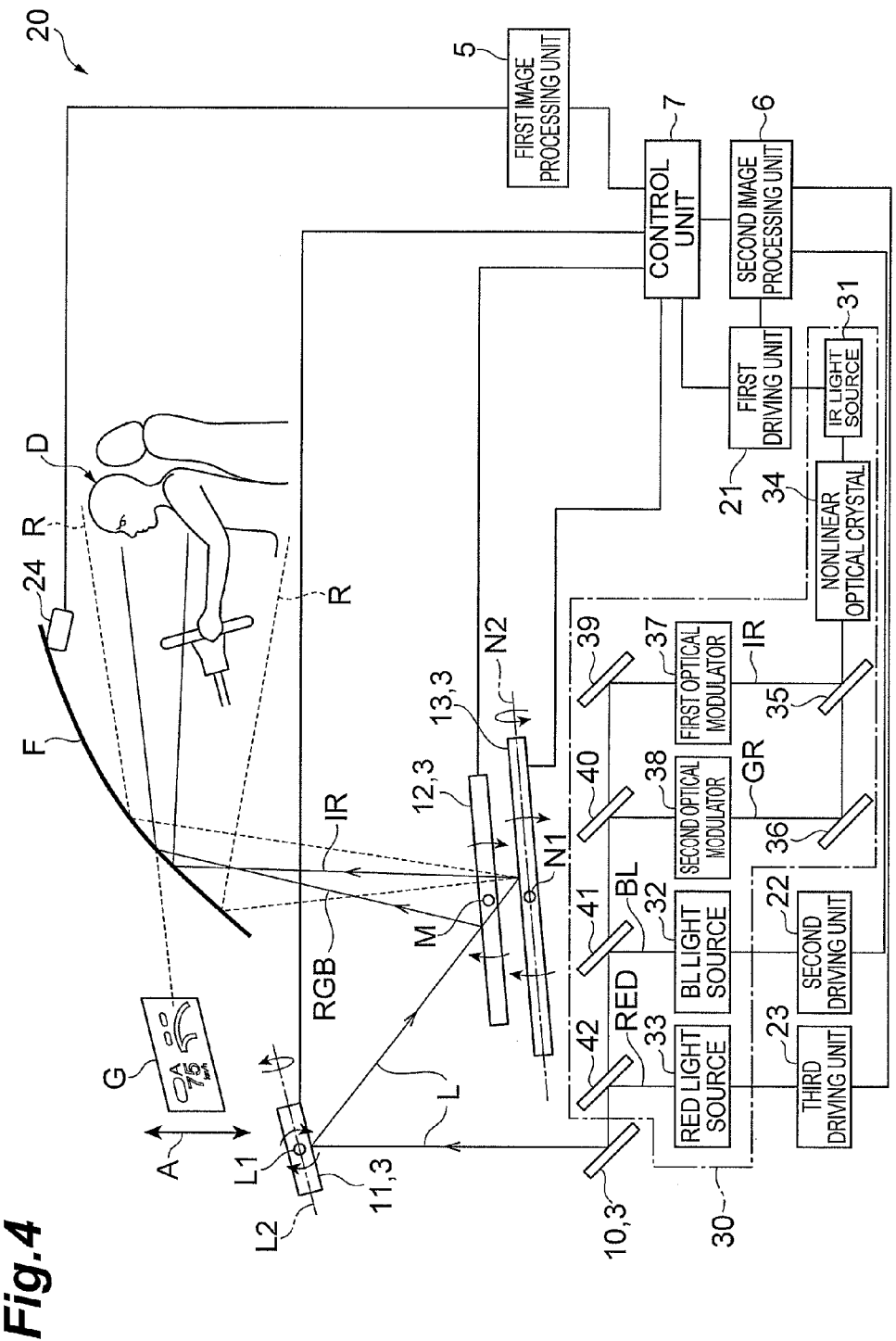
FIG. 4 is a diagram showing a second embodiment of a HUD device according to the invention.

As shown in FIG. 4, in a HUD device 20 according to a second embodiment, the configuration of a light source unit and a driving unit and the position of a CMOS sensor are different from those of the HUD device 1 according to the first embodiment.

A light source unit 30 of the HUD device 20 according to the second embodiment has three laser light sources of an IR light source 31, a BL light source 32, and a RED light source 33. The IR light source 31 is a laser light source which emits infrared light. The IR light source 31 is electrically connected to a first driving unit 21. Infrared light IR emitted from the light source 31 is divided into infrared light IR and green light GR by a nonlinear optical crystal 34.

Infrared light IR divided by the nonlinear optical crystal 34 is reflected toward a first optical modulator 37 by a hot mirror 35. The hot mirror 35 reflects infrared light IR and transmits green light GR. The first optical modulator 37 modulates infrared light IR or switches between the emission and stop of infrared light IR. Infrared light IR emitted from the first optical modulator 37 is reflected toward a fixed mirror 10 by a first total reflection mirror 39.

Green light GR divided by the nonlinear optical crystal 34 transmits through the hot mirror 35 and is reflected toward a second optical modulator 38 by a second total reflection mirror 36. The second optical modulator 38 modulates green light GR or switches between the emission and stop of green light GR. Green light GR emitted from the second optical modulator 38 is reflected toward the fixed mirror 10 by a second cold mirror 40. The second cold mirror 40 is disposed between the first total reflection mirror 39 and the fixed mirror 10. Infrared light IR reflected by the first total reflection mirror 39 transmits through the second cold mirror 40 and is then combined with green light GR. That is, infrared light IR transmitted through the second cold mirror 40 and green light GR reflected by the second cold mirror 40 travel along the same optical path.

The BL light source 32 is a laser light source which emits blue light BL. The BL light source 32 is electrically connected to a second driving unit 22. Blue light BL emitted from the BL light source 32 is reflected toward the fixed mirror 10 by a blue light mirror 41. The blue light mirror 41 is disposed between the second cold mirror 40 and the fixed mirror 10. The blue light mirror 41 reflects blue light BL, and transmits infrared light IR and green light GR. Blue light BL reflected by the blue light mirror 41 transmits through the blue light mirror 41 and is then combined with infrared light IR and green light GR.

The RED light source 33 is a laser light source which emits red light RED. The RED light source 33 is electrically connected to a third driving unit 23. Red light RED emitted from the RED light source 33 is reflected toward the fixed mirror 10 by a red light mirror 42. The red light mirror 42 is disposed between the second cold mirror 40 and the fixed mirror 10. The red light mirror 42 reflects red light RED, and transmits infrared light IR, blue light BL, and green light GR. Red light RED reflected by the red light mirror 42 transmits through the red light mirror 42 and is then combined with infrared light IR, blue light BL, and green light GR.

In the light source unit 30 configured as above, infrared light IR and visible light RGB (red light RED, blue light BL, and green light GR) are combined, and laser light L including infrared light IR and visible light RGB is emitted. The wavelength of visible light RGB of laser light L is determined by controlling the light sources 31 to 33 using the first driving unit 21, the second driving unit 22, and the third driving unit 23 or by switching between the emission and stopping of infrared light IR and green light GR in the optical modulators 37 and 38. For example, in controlling the wavelength of visible light RGB, when the emission of green light GR is not required, the emission of green light GR is stopped by the second optical modulator 38 instead of stopping the IR light source 31, thereby realizing wavelength control of visible light RGB in a state where infrared light IR for line-of-sight detection is emitted.

The CMOS sensor 24 according to the second embodiment is disposed near the rear-view mirror of the interior. In other words, the CMOS sensor 24 is disposed at an obliquely upward position in front of the driver D. The CMOS sensor 24 disposed at this position directly detects infrared light IR reflected at the surface of the driver D, and thus the driver D is imaged.

With the HUD device 20 according to the second embodiment, the substantially same effects as the HUD device 1 according to the first embodiment can be obtained, except that the entire device is not accommodated inside the instrument panel. According to the HUD device 20, since light of the IR light source 31 is divided into infrared light IR and green light GR by the nonlinear optical crystal 34, it is possible to reduce the number of light sources compared to a case where a light source for infrared light and a light source for green light are provided separately. In the HUD device 20, since the CMOS sensor 24 directly detects infrared light IR reflected at the surface of the driver D, it is possible to image the driver D with high accuracy, thereby achieving improvement in reliability relating to the detection of the line-of-sight position of the driver D.

The invention is not limited to the foregoing embodiments.

For example, the configuration of the light source unit is not limited to the above-described configuration. A light source in the light source unit is not limited to a laser light source, and an LED [Light Emitting Diode], a white lamp with increased directivity, or the like may be used as a light source. The three-dimensional image information of the driver D may not be acquired, and the line-of-sight position of the driver D may be detected on the basis of a two-dimensional image.

INDUSTRIAL APPLICABILITY

The invention may be used in an image position adjustment device which adjusts the position of an image in accordance with the line-of-sight position of the user.

REFERENCE SIGNS LIST 1, 20: HUD device (image position adjustment device), 2, 30: light source unit, 3: optical system, 4, 24: CMOS sensor, 5: first image processing unit (line-of-sight position detection unit), 6: second image processing unit, 7: control unit, 8: driving unit, 10: fixed mirror, 11: first scanner minor (third movable reflecting unit), 12: movable cold minor (first movable reflecting unit), 13: second scanner minor (second movable reflecting unit), D: driver (user), F: windshield glass (display unit), L: laser light, GR: green light, BL: blue light, RED: red light, RGB: visible light

The invention claimed is:

1. An image position adjustment device comprising:
a light source unit which emits visible light and infrared light;
a first movable reflecting unit for reflecting visible light and transmitting infrared light;
a second movable reflecting unit for reflecting infrared light transmitted through the first movable reflecting unit;
a display unit for displaying an image using visible light reflected by the first movable reflecting unit; and
a line-of-sight detection unit for imaging a user using reflected light of infrared light reflected by the second movable reflecting unit on the user to detect a line-of-sight position of the user,
wherein the line-of-sight position detection unit has an imaging element which acquires two-dimensional image information of the user, calculates image information in the depth direction of the user from the difference between the light-emission timing of infrared light and the light-reception timing of reflected light, acquires three-dimensional image information of the user on the basis of the image information in the depth direction of the user and the two-dimensional image information of the user acquired by the imaging element, and detects the line-of-sight position of the user on the basis of the three-dimensional image information of the user, and the position of the image is adjusted in accordance with the line-of-sight position detected by the line-of-sight detection unit, by changing a reflection angle of the first movable reflecting unit.

2. The image position adjustment device according to claim 1, wherein infrared light is laser light.

3. The image position adjustment device according to claim 1, further comprising:
   a third movable reflecting unit for reflecting the visible light and infrared light toward the first movable reflecting unit.

4. The image position adjustment device according to claim 1, wherein the second movable reflecting unit and the second movable reflecting unit are configured to rotate on a first and a second rotational axes which are orthogonal to each other.

5. The image position adjustment device according to claim 1, wherein the light source comprises a red light source, a blue light source and an infrared light source.

6. The image position adjustment device according to claim 1, further comprising a non-linear optical crystal configured to split infrared light into infrared light and green light.

7. The image position adjustment device according to claim 1, further comprising a first optical modulator configured to modulate the infrared light.

8. The image position adjustment device according to claim 1, further comprising a red light mirror, a blue light mirror, a hot mirror and a second cold minor.

* * * * *